(12) United States Patent
Chen et al.

(10) Patent No.: US 10,778,643 B2
(45) Date of Patent: Sep. 15, 2020

(54) DATA PROCESSING METHOD, APPARATUS, SYSTEM, AND STORAGE MEDIUM

(71) Applicant: UCloud Tech Co., Ltd, Shanghai (CN)

(72) Inventors: You Chen, Shanghai (CN); Shukai Wu, Shanghai (CN); Yuan Liu, Shanghai (CN); Juyan Zhang, Shanghai (CN); Zhaokai Si, Shanghai (CN)

(73) Assignee: UCLOUD TECH CO., LTD, Shanghai (CN)

( * ) Notice: Subject to any disclaimer, the term of this patent is extended or adjusted under 35 U.S.C. 154(b) by 134 days.

(21) Appl. No.: 15/993,128

(22) Filed: May 30, 2018

(65) Prior Publication Data
US 2018/0375827 A1    Dec. 27, 2018

(30) Foreign Application Priority Data
Jun. 26, 2017   (CN) .......................... 2017 1 0495976

(51) Int. Cl.
*G06F 21/00* (2013.01)
*H04L 29/06* (2006.01)
*G06F 21/53* (2013.01)
*G06F 21/60* (2013.01)

(52) U.S. Cl.
CPC .......... *H04L 63/0209* (2013.01); *G06F 21/53* (2013.01); *G06F 21/602* (2013.01); *H04L 63/10* (2013.01); *G06F 2221/2149* (2013.01)

(58) Field of Classification Search
CPC .................................................. H04L 63/0209
See application file for complete search history.

(56) References Cited

FOREIGN PATENT DOCUMENTS

| | | | |
|---|---|---|---|
| CN | 105184716 | 12/2015 | |
| CN | 106790145 | 5/2017 | |
| JP | 02017016485 A | * 7/2015 | ............. G06Q 40/02 |

* cited by examiner

*Primary Examiner* — Josnel Jeudy
(74) *Attorney, Agent, or Firm* — Hamre, Schumann, Mueller & Larson, P.C.

(57) ABSTRACT

The present disclosure provides a data processing method, a data processing apparatus, a data processing system and a non-volatile storage medium. The method comprises: an acquisition step of acquiring data from at least one data provider and acquiring an algorithm from an algorithm provider via an access gateway; a calculation step of calculating the data according to the algorithm, so as to obtain a calculation result; and a review step of reviewing the calculation result by the at least one data provider via the access gateway, so as to determine whether the calculation result is allowed to be output to at least one result data owner.

11 Claims, 3 Drawing Sheets

DATA PROCESSING METHOD, APPARATUS, SYSTEM, AND STORAGE MEDIUM

This patent document claims benefit under 35 U.S.C. § 119 to CN Patent Application Serial No. 201710495976.4, entitled "DATA PROCESSING METHOD, APPARATUS, SYSTEM, AND STORAGE MEDIUM" and filed on Oct. 3, 2017, 2014, which is fully incorporated herein by reference.

TECHNICAL FIELD

The present disclosure relates to data processing, and particularly to a cloud-based data processing method, apparatus, system, and a storage medium.

BACKGROUND ART

With the advent of the era of big data, more and more result data owners need to acquire required data from data providers, for example data in the field of economics, transportation, healthcare, municipal administration, etc. In order to ensure that the data provider provides data to an authorized result data owner, the existing data provider provides the data to a big data transaction platform by means of encryption, and then the authorized result data owner acquires the required data from the big data transaction platform.

However, the big data transaction platform does not perform any analysis processing on the data, and other result data owners may also acquire, without authorization, data in the big data transaction platform by irregular means. Therefore, there are security risks.

SUMMARY OF THE DISCLOSURE

The present disclosure provides a data processing method, the method comprising:

an acquisition step of acquiring data from at least one data provider and acquiring an algorithm from an algorithm provider via an access gateway;

a calculation step of calculating the data according to the algorithm, so as to obtain a calculation result;

and a review step of reviewing the calculation result by the at least one data provider via the access gateway, so as to determine whether the calculation result is allowed to be output to at least one result data owner.

In the review step, when the reviewing of the calculation result by all of the at least one data provider is passed, it is determined that the calculation result is to be output to the at least one result data owner; and when the reviewing of the calculation result by any of the at least one data provider is not passed, it is determined that the calculation result is not to be output to the at least one result data owner.

The method further comprises: an output step of outputting the calculation result to the at least one result data owner when it is determined that the calculation result is to be output to the at least one result data owner.

The method further comprises: a deletion step of deleting the data, the algorithm and the calculation result after outputting the calculation result to the at least one result data owner or determining that the calculation result is not to be output to the at least one result data owner. Thus, relevant data, algorithms and results (e.g., the entire calculation environment) can be prevented from being accidentally leaked, so that the security is improved.

The method further comprises: recording respective processes of the access gateway, the acquisition step, the calculation step, the review step, the output step, and the deletion step.

The present disclosure further provides a data processing apparatus, the apparatus comprising:

an access gateway;

an acquisition unit for acquiring data from at least one data provider and acquiring an algorithm from an algorithm provider via the access gateway;

a data calculation sandbox for calculating the data according to the algorithm, so as to obtain a calculation result;

and a review sandbox for reviewing the calculation result by the at least one data provider via the access gateway, so that the review sandbox determines whether the calculation result is to be output to at least one result data owner.

When the reviewing of the calculation result by all of the at least one data provider is passed, the review sandbox determines that the calculation result is to be output to the at least one result data owner; and when the reviewing of the calculation result by any of the at least one data provider is not passed, the review sandbox determines that the calculation result is not to be output to the at least one result data owner.

The apparatus further comprises: an output unit, wherein the output unit outputs the calculation result to the at least one result data owner when the review sandbox determines that the calculation result is to be output to the at least one result data owner.

The apparatus further comprises: a deletion unit, wherein the deletion unit deletes the data, the algorithm and the calculation result after the output unit outputs the calculation result to the at least one result data owner or the review sandbox determines that the calculation result is not to be output to the at least one result data owner.

The apparatus further comprises: a recording unit for recording respective processes of the access gateway, the acquisition unit, the data calculation sandbox, the review sandbox, the output unit and the deletion unit.

The recording unit is a block chain. Thus, it is convenient for an audit to trace the respective processing processes of various modules, so as to ensure data operations transparent and traceable, and it is difficult to modify the records, so that the reliability of data storage can be improved.

The present disclosure further provides a data processing system, the system comprising: at least one data provider, an algorithm provider, at least one result data owner, and a data processing apparatus as described above, wherein the data processing apparatus calculates the data according to the algorithm, so as to obtain the calculation result, and the at least one data provider reviews the calculation result via the access gateway, so as to determine whether the data processing apparatus is allowed to output the calculation result to the at least one result data owner.

The present disclosure further provides a non-volatile storage medium storing a data processing program on the non-volatile storage medium, wherein the program is executed by a computer to implement a data processing method, the program comprising:

an acquisition instruction for acquiring data from at least one data provider and acquiring an algorithm from an algorithm provider via an access gateway;

a calculation instruction for calculating the data according to the algorithm, so as to obtain a calculation result;

and a review instruction for reviewing the calculation result by the at least one data provider via the access gateway, so as to determine whether the calculation result is allowed to be output to at least one result data owner.

By means of the present disclosure, data can be securely processed and provided to a result data owner.

DETAILED DESCRIPTION OF EMBODIMENTS

The embodiments of the present disclosure will be illustrated in detail below in conjunction with the accompanying drawings.

Figure 1:
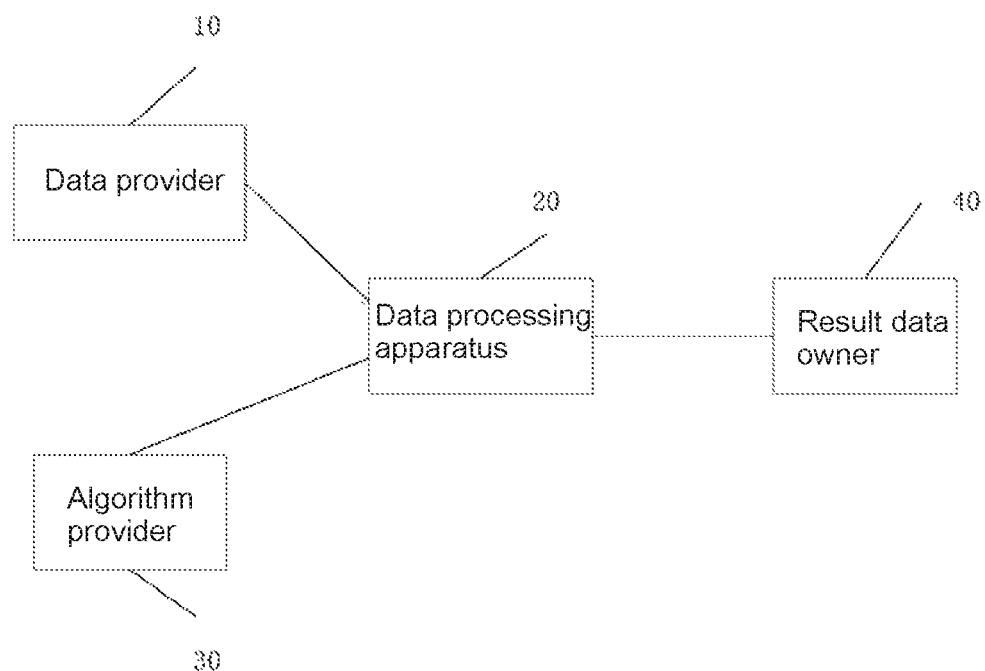
FIG. 1 is a schematic diagram of a data processing system according to an embodiment of the present disclosure.
Figure 2:
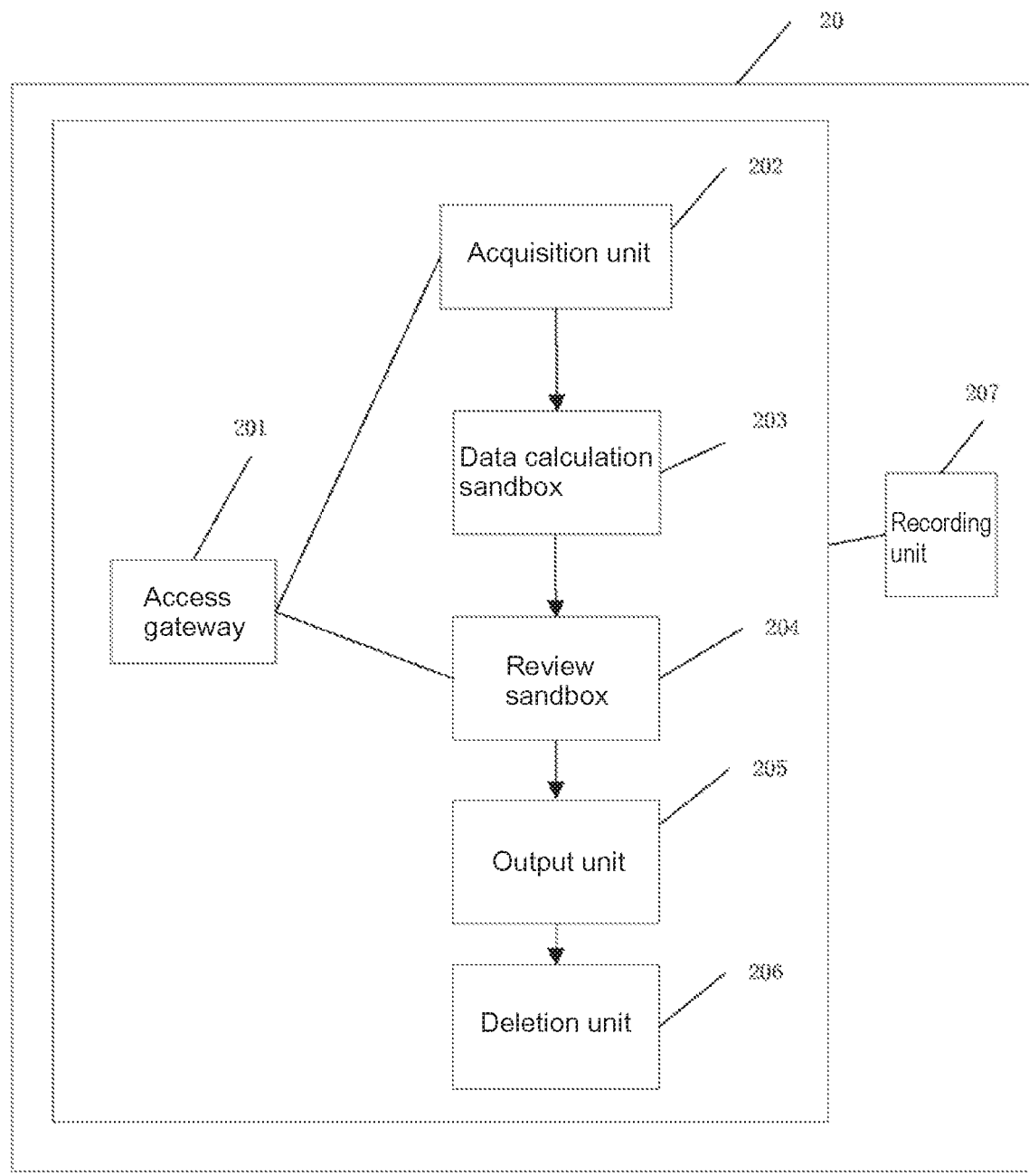
FIG. 2 is a schematic diagram of a data processing apparatus according to an embodiment of the present disclosure.

FIG. 1 is a schematic diagram of a data processing system 1 according to an embodiment of the present disclosure. The data processing system 1 comprises at least one data provider 10, an algorithm provider 30, at least one result data owner 40, and a cloud-based data processing apparatus 20. FIG. 2 is a schematic diagram of a data processing apparatus 20 according to an embodiment of the present disclosure, wherein the data processing apparatus 20 comprises an access gateway 201, an acquisition unit 202, a data calculation sandbox 203, and a review sandbox 204.

The embodiments of the present disclosure will be illustrated in detail below in conjunction with FIGS. 1, 2 and 3.

Figure 3:
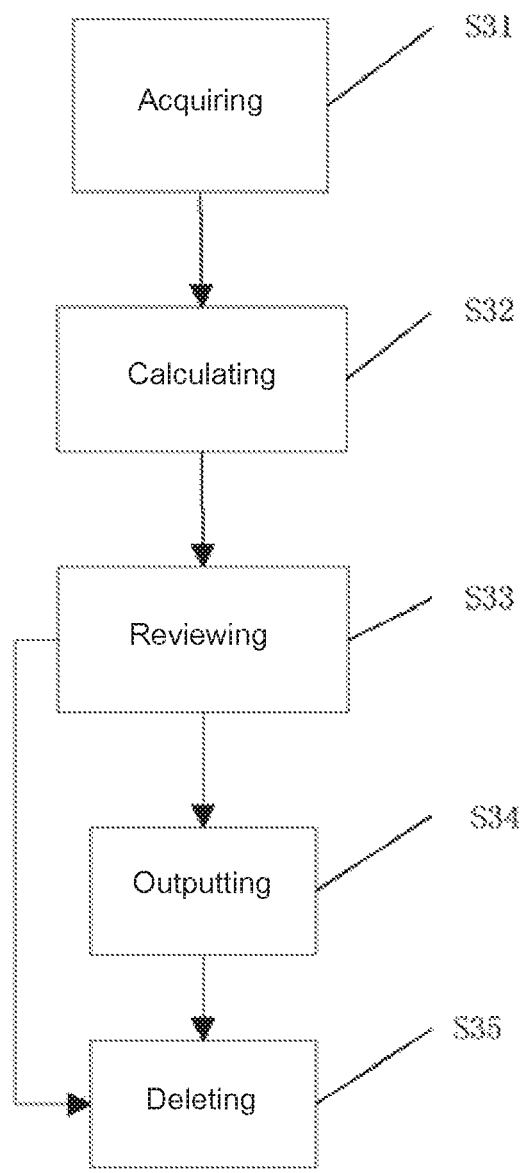
FIG. 3 is a flow chart of a data processing method according to an embodiment of the present disclosure.

FIG. 3 is a flow chart of a data processing method of an embodiment of the present disclosure. In step S31, the acquisition unit 202 acquires data from at least one data provider 10 and acquires an algorithm from the algorithm provider 30 via the access gateway 201.

At least one data provider 10 stores the data in a corresponding cloud storage (not shown in the figure), and the acquisition unit 202 acquires the data from the corresponding cloud storage. In order to protect the security of data in transmission, the algorithm provider 30 transfers the algorithm thereof to the acquisition unit 202 via the access gateway 201 and performs corresponding deployment, so that the acquisition unit 202 acquires the algorithm. Here, the existing access gateway 201 is a data centre-oriented operation and maintenance auditing module, which can provide functions such as single sign-on, account management, authorization management and security auditing.

In step S32, the data calculation sandbox 203 calculates the acquired data according to the above-mentioned algorithm, so as to obtain a calculation result, and the data calculation sandbox 203 transfers the calculation result to the review sandbox 204.

In step 33, the at least one data provider 10 reviews the above-mentioned calculation result via the access gateway 201, so that the review sandbox 204 determines whether the calculation result is to be output to the at least one result data owner 40.

When the reviewing of the calculation result by all of the at least one data provider 10 is passed, the review sandbox 204 determines that the calculation result is to be output to the at least one result data owner 40; and when the reviewing of the calculation result by any of the at least one data provider 10 is not passed, the review sandbox 204 determines that the calculation result is not to be output to the at least one result data owner.

Here, before being output, the calculation result is reviewed by the at least one data provider 10, so that the review sandbox 204 determines whether the calculation result is allowed to be output, and thus, the at least one data provider 10 can perform security review to prevent the output of an unexpected calculation result.

The data processing apparatus 20 of the present disclosure further comprises: an output unit 205, wherein in step S34, the output unit 205 outputs the calculation result to the at least one result data owner 40 when the review sandbox 204 determines that the calculation result is to be output to the at least one result data owner 40.

The output unit 205 outputs the calculation result to the cloud storage (not shown in the figure) corresponding to the at least one result data owner 40, and then the at least one result data owner 40 can acquire the calculation result from the cloud storage.

The data processing apparatus 20 of the present disclosure further comprises: a deletion unit 206, wherein in the step S35, the deletion unit 206 deletes the above-mentioned data, algorithm and calculation result after the output unit 205 outputs the calculation result to the at least one result data owner 40 or the review sandbox 204 determines that the calculation result is not to be output to the at least one result data owner 40. Thus, the processed data can be deleted in time in order to prevent leakage.

The data processing apparatus 20 of the present disclosure further comprises: a recording unit 207 for recording respective processes of the access gateway 201, the acquisition unit 202, the data calculation sandbox 203, the review sandbox 204, the output unit 205 and the deletion unit 206. The recording unit 207 is, for example, an existing block chain, which makes it convenient for an audit to trace the respective processing processes of various modules, so as to ensure data operations transparent and traceable, and also makes it difficult to modify the records, so that the reliability of data storage can be improved.

In addition, after the reviewing of the calculation result by any of the at least one data provider 10 is not passed, and the review sandbox 204 determines that the calculation result is not to be output to the at least one result data owner 40, any data provider that fails to pass the review may inform the algorithm provider 30 to provide an adjusted algorithm to the acquisition unit 202 according to a predetermined agreement, so that the data calculation sandbox 203 recalculates the acquired data according to the adjusted algorithm, so as to obtain a new calculation result. At least one data provider 10 reviews the new calculation result again, and if the review is passed, the new calculation result is output, otherwise, the algorithm provider 30 provides a re-adjusted algorithm and repeats the above-mentioned processes until the review is passed and the calculation result is output. In addition, after the final calculation result is output, the deletion unit 206 deletes the above-mentioned data and all the previous algorithms and calculation results.

In the present disclosure, the data provider and the result data owner may be units of different industries without limitation, and therefore, the present disclosure may process different industries and different types of data, so that the result data owner can acquire desired data contents. Moreover, the present disclosure only outputs, when the review of the calculation results by all the data providers is passed, same to the result data owner, thereby improving data security.

In addition, for example, if a data provider is company A, and a result data owner is company B, company A provides data according to the above-mentioned method and allows the calculation result to be output to company B, while company B can also provide, as the data provider, data thereof according to the above-mentioned method and allow the calculation result thereof to be output to company A as the result data owner.

Although the present disclosure has been described in conjunction with the specific embodiments, many alternatives, modifications, and variations made according to the description above will be obvious to those skilled in the art. Therefore, when such alternatives, modifications and variations fall within the spirit and scope of the appended claims, they should be included in the present disclosure.

The invention claimed is:

1. A data processing method, characterized in that the method comprises:
   acquiring data from at least one data provider and acquiring an algorithm from an algorithm provider via an access gateway;
   calculating the data according to the algorithm, to obtain a calculation result;
   reviewing the calculation result by the at least one data provider via the access gateway, to determine whether the calculation result is allowed to be output to at least one result data owner, and
   after determining that the calculation result is not allowed to be output to the at least one result data owner, acquiring an adjusted algorithm from the algorithm provider and recalculating the acquired data according to the adjusted algorithm to obtain a new calculation result.

2. The data processing method of claim 1, further comprising:
   after determining that the calculation result is allowed to be output to the at least one result data owner, determining that the calculation result is to be output to the at least one result data owner.

3. The data processing method of claim 2, characterized in that the method further comprising:
   outputting the calculation result to the at least one result data owner.

4. The data processing method of claim 3, the method further comprising:
   deleting the data, the algorithm and the calculation result after outputting the calculation result to the at least one result data owner or after determining that the calculation result is not allowed to be output to the at least one result data owner.

5. The data processing method of claim 4, wherein the method comprises:
   recording the acquired data, the acquired algorithm, the calculation result, the determination of whether the calculation result is allowed to be output to the at least one result data owner, the determination of whether the calculation result is output to the at least one result data owner, and an indication of whether the data, algorithm, and calculation result are deleted.

6. A data processing apparatus, characterized in that the apparatus comprises comprising:
   an access gateway;
   a data calculation sandbox for acquiring data from at least one data provider and acquiring an algorithm from an algorithm provider via the access gateway, and calculating the data according to the algorithm, to obtain a calculation result;
   a review sandbox for determining whether to output the calculation result to at least one result data owner after reviewing the calculation result by the at least one data provider via the access gateway, and
   after determining that the calculation result is not allowed to be output to the at least one result data owner, acquiring an adjusted algorithm from the algorithm provider and recalculating the acquired data according to the adjusted algorithm to obtain a new calculation result.

7. The data processing apparatus of claim 6, wherein, after determining that the calculation result is allowed to be output to the at least one result data owner, the review sandbox determines to output the calculation result to the at least one result data owner.

8. The data processing apparatus of claim 7, further comprising:
   an output unit that outputs the calculation result to the at least one result data owner when the review sandbox determines to output the calculation result to the at least one result data owner.

9. The data processing apparatus of claim 8, further comprising:
   a deletion unit that deletes the data, the algorithm and the calculation result after the output unit outputs the calculation result to the at least one result data owner or the review sandbox determines that the calculation result is not allowed to be output to the at least one result data owner.

10. The data processing apparatus of claim 9, further comprising:
    a recording unit that records respective processes of the access gateway, the acquisition unit, the data calculation sandbox, the review sandbox, the output unit and the deletion unit.

11. A non-volatile storage medium having a data processing program stored thereon, wherein the program is executed by a computer to implement a data processing method, characterized in that the program comprises:
    an acquisition instruction for acquiring data from at least one data provider and acquiring an algorithm from an algorithm provider via an access gateway;
    a calculation instruction for calculating the data according to the algorithm, to obtain a calculation result;
    a review instruction for reviewing the calculation result by the at least one data provider via the access gateway, to determine whether the calculation result is allowed to be output to at least one result data owner and
    after determining that the calculation result is not allowed to be output to the at least one result data owner, acquiring an adjusted algorithm from the algorithm provider and recalculating the acquired data according to the adjusted algorithm to obtain a new calculation result.

* * * * *